July 2, 1935.  A. A. VARESE  2,007,100
COMBINED CAP AND PRESSURE APPLYING ATTACHMENT
Filed Jan. 30, 1934   2 Sheets-Sheet 1
Fig. 1.
Fig. 2.
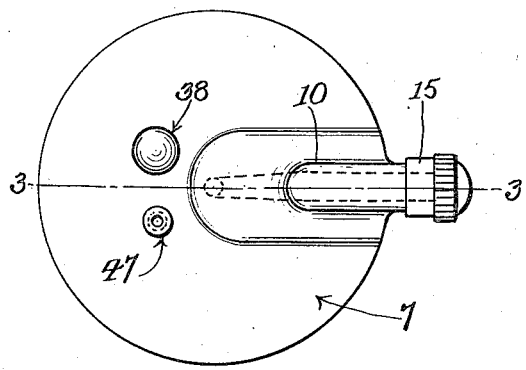
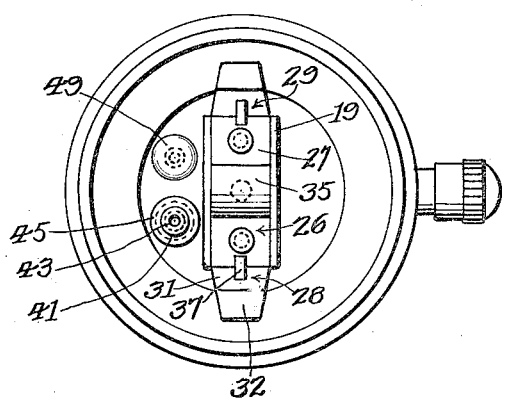
Fig. 3.
Fig. 4.
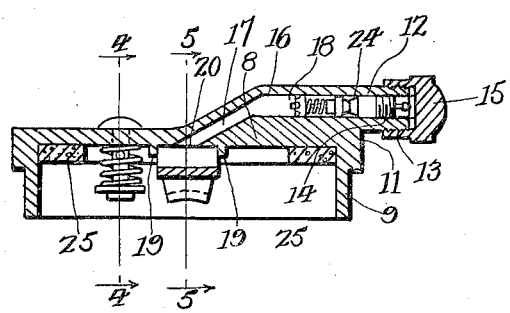
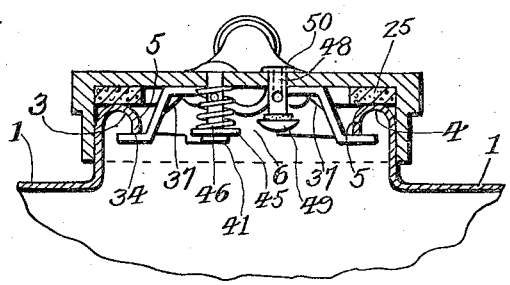
Fig. 5.
Fig. 6.
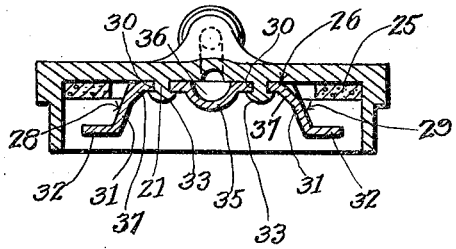
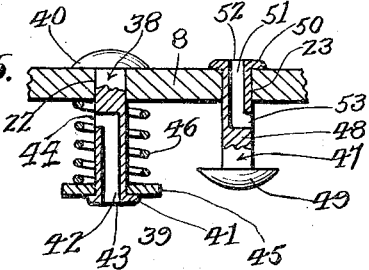
Inventor
Anthony A. Varese
By Geo. P. Kimmel
Attorney July 2, 1935.  A. A. VARESE  2,007,100
COMBINED CAP AND PRESSURE APPLYING ATTACHMENT
Filed Jan. 30, 1934  2 Sheets-Sheet 2
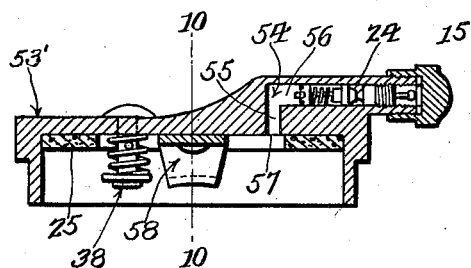
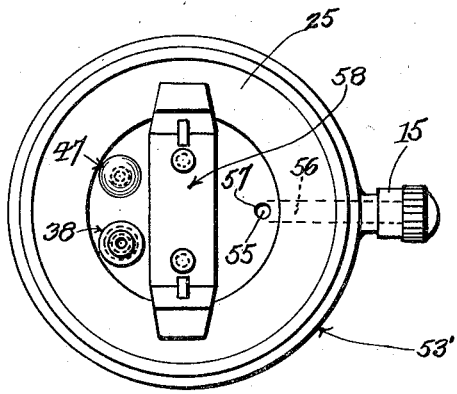
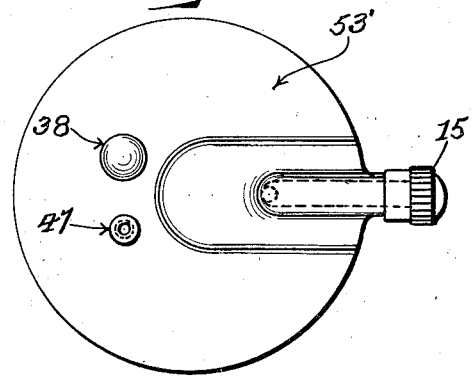
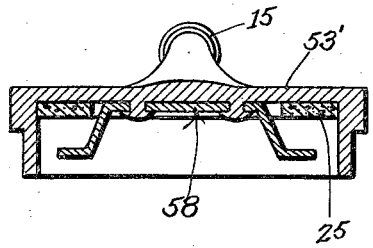
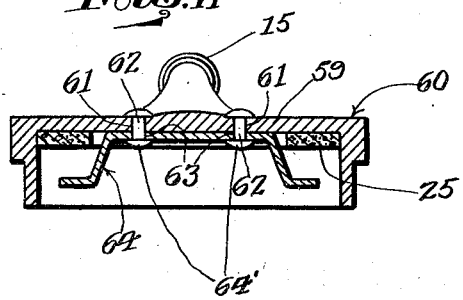
Inventor
Anthony A. Varese
By Geo. F. Kimmel
Attorney Patented July 2, 1935

2,007,100

UNITED STATES PATENT OFFICE 2,007,100

COMBINED CAP AND PRESSURE APPLYING ATTACHMENT

Anthony A. Varese, Chicago, Ill.

Application January 30, 1934, Serial No. 709,007

12 Claims. (Cl. 220—24)

This invention relates to a combined cap and pressure applying attachment for the fuel tanks of automotive vehicles, and is an improvement upon the construction of the device disclosed in my application filed November 3, 1933, Serial Number 696,573 for applying fluid pressure to the fuel tank for the purpose of cleaning the fuel feed line; for refilling vacuum tanks when dry; for forcing fuel to a carburetor when necessary; and for cleaning out a carburetor.

The invention is for the same purpose as the device referred to and not only embodies the objects and advantages as set forth in the aforesaid application, but has for its further object to provide, a valve controlled fluid pressure supply conduit within the body portion of the cap and having its outer portion disposed radially of the cap.

A further object of the invention is to provide, in a manner as hereinafter set forth, an attachment of the class referred to with means to constitute a valve controlled pressure supply conduit having a part extended radially from the body portion of the cap of the attachment for connection to a source of pressure supply.

A further object of the invention is to provide, in a manner as hereinafter set forth, an attachment of the class referred to, with a suspended normally open air vent shiftable to closed position on the supply of fluid pressure to the tank and with a suspended normally closed pressure relief valve shiftable to open position for relief purposes when necessary by the fluid pressure supplied to the tank.

A further object of the invention is to provide, in a manner as hereinafter set forth, an attachment for the purpose referred to, including a cap element having its body formed with a normally closed valve controlled fluid pressure conducting conduit or channel of angle form capable of being detachably connected with a source of fluid pressure supply and when so connected functioning to discharge pressure into the tank.

Further objects of the invention are to provide, in a manner as hereinafter set forth, an attachment for the purpose referred to, which is simple in its construction and arrangement, strong, durable, compact, readily coupled to and removable from the fuel tank, thoroughly efficient in its use, conveniently attached to a source of fuel pressure, and inexpensive to manufacture.

To the above ends essentially and to others which may hereinafter appear, the invention consists of such parts, and such combination of parts, which fall within the scope of the invention as claimed.

In the drawings:

Figure 1 is a top plan view of the attachment.

Figure 2 is an inverted plan thereof.

Figure 3 is a section on line 3—3 Figure 1.

Figure 4 is a section on line 4—4 Figure 3, with the addition of the tank neck and portion of the tank.

Figure 5 is a section on line 5—5 Figure 3.

Figure 6 is a sectional detail showing the pressure relieving and air inlet elements.

Figure 7 is a cross sectional view of a modified form of attachment.

Figure 8 is an inverted plan of the modified form.

Figure 9 is a top plan of the modification.

Figure 10 is a section on line 10—10 Figure 7.

Figure 11 is a cross sectional view of still another modified form of the attachment.

The attachment is illustrated by way of example in Figure 4, as providing a closure cap for a fuel tank 1. It is to be understood, however, that the attachment may or may not be a permanent closure cap for the tank, as it may be stored in the vehicle, and when occasion requires substituted for the desired period for the tank closure. The tank 1 includes a filling neck 2 formed at its top with a pair of oppositely disposed spaced inwardly extending flanges 3, 4 of curved cross section having downturned inner parts 5. The flanges constitute keepers for a latching member to be hereinafter referred to. The spaces between the flanges are indicated at 6 and form clearances to permit of positioning the latching member to coact with the flanges to couple the attachment to the neck 2.

Referring to Figures 1 to 6 of the drawings, the attachment as shown includes an annular cap member 7 for closing neck 2 and which is formed of a top 8 and a rim 9 depending from the latter. The inner diameter of the rim 9 with respect to the outer diameter of neck 2 is such that the inner face of the rim will snugly engage the outer face of the neck. The top 8 is formed on its upper face and at the diametric center thereof with an upstanding, radially disposed enlargement 10, which extends from the axis of said top to the edge 11 of the latter. The enlargement 10 consists of a lower portion and an upper portion and with the former of greater width and length than that of the latter. The upper portion is disposed at the lengthwise center and has its outer end flush with the outer end of said lower portion. The outer end of the upper portion terminates in a tubular extension 12 projected beyond said edge. The extension 12 constitutes a fluid pressure intake and is formed with external and internal threads 13, 14 respectively. The extension 12 is normally closed by a cap 15 detachably engaging with the threads 13. The extension 12, when cap 15 is removed, is adapted to be connected by any suitable means with a source (not shown) of fluid pressure supply. The top 8 and enlargement 10 are bored to provide a fluid pressure conducting channel or conduit 16 formed of an inner and an outer portion or branch 17, 18 respectively which open at one end into each other. The other end of portion 17 opens at the inner face of top 8 axially thereof. The portion 17 extends at an upward inclination from the inner face of top 8. The portion 18 is disposed in parallelism with respect to the inner face of top 8 and has its other end permanently opening into the inner end of the extension 12. The inner face of top 8 adjacent to each side of the axis thereof is provided with a pair of depending parallel spaced ribs 19, which are also spaced from the inner end 20 of portion 17. Depending from the inner face of top 8 between and spaced from ribs 19 and having the inner end 20 of portion 17 arranged therebetween, is a pair of spaced bosses 21. Between the axis and edge 11 of top 8 is a pair of spaced aligning openings 22, 23.

Positioned in the extension 12 and portion 18 is an operable spring controlled normally closed valve mechanism 24 having a part thereof engaging with the threads 14 whereby said mechanism is anchored to the cap member 7. The mechanism 22, when cap 15 is removed, is operated from the intake provided by extension 12.

Arranged within cap 7 and abutting the inner face of top 8 and rim 9 is a compressible sealing element 25 in the form of an annulus. When the attachment is coupled to neck 2, the sealing element 25 bears against the high parts of the flanges 3, 4 and is compressed thereby to provide a sealed tight joint between the attachment and the neck. When the attachment is removed from the tank, the sealing member will be retained in the cap member by the latching member to be referred to.

The latching member is generally indicated at 26 and is formed from a strap of metallic material. The latching member consists of an intermediate rectangular portion 27 and a pair of oppositely inclined angle-shaped end portions 28, 29 disposed at an angle with respect to portion 27. The portion 27 is formed with a pair of spaced openings 30 and is positioned against the inner face of top 8 between the ribs 19. These latter correspond in length to that of portion 27. Each end portion consists of legs 31 and 32. The legs 31 are integral at one end with an end of portion 27 and are outwardly inclined with respect to the latter. The legs 32 extend outwardly at right angles to legs 31 and are disposed in parallelism to the inner face of top 8. The bosses 21, when portion 27 is positioned between the ribs 19, extend through the openings 30 and are then upset, as at 33 to clamp member 26 against the inner face of top 8.

The legs 32 coact with the edges 34 of the flanges 3, 4 for latching the attachment to and in closed position with respect to the neck 2 of the tank 1. The clearances 6 permit of the latching member 26 entering neck 2, after which the attachment is given a quarter turn to bring the legs 32 to engage the edges 34 of the flanges. The end portions 28, 29 are resilient and of less width than portion 27.

The intermediate portion 27 at its transverse median is formed with a depressed portion 35 providing a semi-circular groove 36 having its center positioned directly below the end 20 of portion 17 of the conduit or channel 16. The groove 36 is open at each end and constitutes a channel for conducting the supplied fluid pressure directly into the tank at two points.

At the points of joinder of the end portions 28, 29 with the intermediate portion 27 of the latching member 26, the latter is depressed, as at 37, for reinforcing purposes.

Slidably mounted in the opening 22 is a fluid pressure relieving element 38 consisting of a stem 39 formed at its upper end with a head 40, and at its lower end with a laterally disposed annular flange 41. The stem 39 is formed with an angle-shaped fluid pressure outlet passage 42 which opens at the inner end of the stem and at the periphery of the stem, as at 43, 44 respectively. The open end 44 of passage 42 is positioned between the transverse median of the stem and head 40. Supported by flange 41 is a movable stop 45 in the form of an annulus and which surrounds stem 39. Interposed between stop 45 and the inner face of top 8 of cap member 7 and encompassing stem 39 is a coiled controlling spring 46 functioning to normally maintain the open discharge end 44 of passage 42 below the inner face of said top 8. The latter in connection with the head 40 slidably suspends element 38 dependingly within the neck 2. When the fluid pressure supplied to tank 1 builds up within the neck 2 it acts upon element 38 and shifts the latter upwardly against the action of spring 46 to an extent to open passage 42 to the atmosphere thereby providing an exhaust of fluid pressure to the atmosphere for relief purposes. The element 38 is normally in closed position.

Slidably mounted in the opening 23 is an air inlet element 47 consisting of a stem 48 formed at its lower end with a head 49 and at its upper end with a laterally disposed annular flange 50. The stem 47 is formed with an angle-shaped air passage 51 which opens at the outer end of stem 48 and at the periphery of the stem 48 as at 52, 53 respectively. The open end 53 of passage 51 is positioned substantially at the transverse median of the stem 47 and normally below the inner face of the top 8 of cap member 7. The flange 50 in connection with top 8 slidably suspends element 47 dependingly within the neck 2. When fluid pressure is supplied to the tank it acts upon element 47 and shifts it to an extent to position end 53 above the top of the cap member whereby the neck 2 is closed to the atmosphere. The element 47 is normally in open position.

The construction of the form shown in Figures 7, 8, 9 and 10 is the same as that shown in Figures 1 to 6 with the exception that the fluid pressure conducting channel or conduit in cap member 53' and indicated at 54 consists of an inner and an outer portion or branch 55, 56 respectively which are disposed at right angles to each other. The portion 55 is disposed parallel to the axis of the cap member 53' and opens at the inner face of the latter, as at 57 at a point spaced from said axis. The portion 56 is arranged similar to that of portion 18 with respect to the inner face of the top of the cap member. The latching member indicated at 58 is not formed at its transverse median with a groove such as provided in the latching member 26. Otherwise than that as stated, the form shown by Figures 7 to 10 is the same as that shown by Figures 1 to 6.

The form shown in Figure 11 relates solely to a different manner of anchoring the latching member to the cap member, and in this connection the top 59 of cap member 60 is formed with a pair of spaced openings 61 through which pass headed rivets 62. These latter also pass through openings 63 in latching member 64 and are upset as at 64' for clamping the latching and cap members together.

The cap of the attachment may be of any suitable size; it may be secured in position by any means found to be applicable, and that the means as shown is illustrated by way of example.

What I claim is:—

1. In a combined closure cap and fluid pressure applying attachment for fuel tanks of automotive vehicles, a cap member including a top formed with a radially disposed tubular extension providing a pressure intake, said top being provided with a fluid pressure conducting channel formed of a pair of communicating portions disposed at an angle with respect to each other, one of said portions forming a continuation of said intake and the other of said portions opening at the inner face of said top, a normally closed spring controlled shiftable valve mechanism arranged in that portion forming a continuation of said intake, a normally open vertically shiftable atmospheric air intake element suspended from and bodily movable relatively to said top by and on the application of fluid pressure to the tank, and a normally closed spring controlled vertically shiftable fluid pressure relief element suspended from and bodily movable relative to said top by and on the building up of the fluid pressure supplied to the tank.

2. In a combined closure cap and fluid pressure applying attachment for the fuel tanks of automotive vehicles, a cap member including a top having its lower face formed with a pair of spaced parallel ribs and a pair of spaced depending bosses between said ribs, and a latching member having an intermediate portion and a pair of end portions, said intermediate portion positioned against the inner face of said top between said ribs and anchored to said bosses, the said end portions being of angled contour and extended from said inner face, said intermediate portion being formed in that face thereof opposing said inner face with a transverse groove, said top being formed with means to provide a fluid pressure conduit including an inner and an outer portion merging into each other at one end and disposed at an angle to each other, said inner portion opening at its other end at said groove and said outer portion opening at its other end at a point spaced outwardly from the edge of said top, and a shiftable valve mechanism arranged in said outer portion for normally closing said conduit.

3. In a combined closure cap and fluid pressure applying attachment for the fuel tanks of automotive vehicles, a cap member including a top having its lower face formed with a pair of spaced parallel ribs and a pair of spaced depending bosses between said ribs, and a latching member having an intermediate portion and a pair of end portions, said intermediate portion positioned against the inner face of said top between said ribs and anchored to said bosses, the said end portions being of angled contour and extended from said inner face, said intermediate portion being formed in that face thereof opposing said inner face with a transverse groove, said top being formed with means to provide a fluid pressure conduit including an inner and an outer portion merging into each other at one end and disposed at an angle to each other, said inner portion opening at its other end at said groove and said outer portion opening at its other end at a point spaced outwardly from the edge of said top, a shiftable valve mechanism arranged in said outer portion for normally closing said conduit, a normally open vertically shiftable atmospheric air intake element suspended from and bodily movable relatively to said top by and on the application of fluid pressure to the tank, and a normally closed spring controlled vertically shiftable fluid pressure relief element suspended from and bodily movable relative to said top by and on the building up of the fluid pressure supplied to the tank.

4. In a combined closure cap and fluid pressure applying attachment for fuel tanks of automotive vehicles, a cap member for closing the filling neck of the tank and formed of a top and a rim, said top being provided therein with a normally closed valve controlled fluid pressure supply conduit formed of a pair of portions communicating at one end with and disposed at an angle to each other, one of said portions having its other end at the inner face of the top, the other of said portions disposed in parallelism to said inner face and adapted to communicate with a source of fluid pressure supply, a normally closed spring controlled valve mechanism arranged in the said other portion and capable of being shifted to open position from the other end of said other portion, a normally open vertically shiftable atmosphere air intake element suspended from and bodily movable relatively to said top by and on the application of fluid pressure to the tank, and a normally closed spring controlled vertically shiftable fluid pressure relief element suspended from and bodily movable relative to said top by and on the building up of the fluid pressure supplied to the tank.

5. In a combined closure cap and fluid pressure applying attachment for fuel tanks of automotive vehicles, a cap member provided with means for securing it to the filling neck of the tank, said member formed of a rim and a top having a radially disposed tubular extension having means for detachably connecting it with a source of fluid pressure supply, said top being formed therein with a normally closed valve controlled fluid pressure supply conduit of angle form opening at one end at the inner face of said top, said conduit having a portion thereof disposed in parallelism to said inner face and opening into said tubular extension, a normally closed spring controlled valve mechanism arranged in said extension and said portion and shiftable to open position from the outer end of said extension, a normally open vertically shiftable atmospheric air intake element suspended from and bodily movable relatively to said top by and on the application of fluid pressure to the tank, and a normally closed spring controlled vertically shiftable fluid pressure relief element suspended from and bodily movable relative to said top by and on the building up of the fluid pressure supplied to the tank.

6. In a combined closure cap and fluid pressure applying attachment for the fuel tanks of automotive vehicles, a cap member for closing the filling neck of the tank and including a top and a rim, said top being provided with means extending radially from its edge to constitute a fluid pressure intake, said top being formed in its body with a fluid pressure conduit leading from said intake and opening at the inner face thereof, an operable valve mechanism arranged in said conduit for normally closing the latter and operated to open the conduit from said intake, a bodily shiftable normally open air inlet element slidably suspended from said top and shifted to closed position on the supply of fluid pressure to the tank, and a spring controlled bodily shiftable normally closed pressure relieving element slidably suspended from said top and shifted to open position on the building up of the fluid pressure supplied to the tank.

7. In a combined closure cap and fluid pressure supplying attachment for fuel tanks of automotive vehicles, a cap member for closing the filling neck of the tanks and including a rim and a top of disc-like form at the upper end of the rim, said top being formed on its outer face with a radially disposed enlargement having its outer end flush with the edge of the top, said enlargement formed of a lower portion and an upper portion, the latter being of less length and of less width than said lower portion, the outer of said portions aligning, a tubular extension integral with the outer end of said upper portion and providing a pressure intake, that part of said top being formed with the enlargement being provided with a radially disposed fluid pressure conducting channel formed of a pair of communicating portions disposed at an angle to each other, one of said channel portions forming an inward continuation of said extension, the other of said channel portions opening at the inner face of said top, and a normally closed spring controlled shiftable valve mechanism arranged in that channel portion forming a continuation of said extension.

8. In a combined closure cap and fluid pressure supplying attachment for fuel tanks of automotive vehicles, a cap member for closing the filling neck of the tank and including a rim and a top of disc-like form at the upper end of the rim, said top being formed on its outer face with a radially disposed enlargement having its outer end flush with the edge of the top, said enlargement formed of a lower portion and an upper portion, the latter being of less length and of less width than said lower portion, the outer ends of said portions aligning, a tubular extension integral with the outer end of said upper portion and providing a pressure intake, that part of said top being formed with the enlargement being provided with a radially disposed fluid pressure conducting channel formed of a pair of communicating portions disposed at an angle to each other, one of said channel portions forming an inward continuation of said extension, the other of said channel portions opening at the inner face of said top, and a normally closed spring controlled shiftable valve mechanism arranged in that channel portion forming a continuation of said extension, and a normally open vertically shiftable atmospheric air intake element slidably suspended from said top adjacent said enlargement and bodily movable relative to the said top by and on the application of fluid pressure to the tank.

9. In a combined closure cap and fluid pressure supplying attachment for fuel tanks of automotive vehicles, a cap member for closing the filling neck of the tanks and including a rim and a top of disc-like form at the upper end of the rim, said top being formed on its outer face with a radially disposed enlargement having its outer end flush with the edge of the top, said enlargement formed of a lower portion and an upper portion, the latter being of less length and of less width than said lower portion, the outer ends of said portions aligning, a tubular extension integral with the outer end of said upper portion and providing a pressure intake, that part of said top being formed with the enlargement being provided with a radially disposed fluid pressure conducting channel formed of a pair of communicating portions disposed at an angle to each other, one of said channel portions forming an inward continuation of said extension, the other of said channel portions opening at the inner face of said top, and a normally closed spring controlled shiftable valve extension, and a normally open vertically shiftable atmospheric air intake element slidably suspended from said top adjacent said enlargement and bodily movable relative to the said top by and on the application of fluid pressure to the tank, and a normally closed spring controlled vertically shiftable fluid pressure relief element slidably suspended from the top adjacent said enlargement and bodily movable relative to the top by and on the building up of fluid pressure supplied to the tank.

10. In a combined closure cap and fluid pressure supplying attachment for fuel tanks of automotive vehicles, a cap member for closing the filling neck of the tanks and including a rim and a top of disc-like form at the upper end of the rim, said top being formed on its outer face with a radially disposed enlargement having its outer end flush with the edge of the top, said enlargement formed of a lower portion and an upper portion, the latter being of less length and of less width than said lower portion, the outer of said portions aligning, a tubular extension integral with the outer end of said upper portion and providing a pressure intake, that part of said top being formed with the enlargement being provided with a radially disposed fluid pressure conducting channel formed of a pair of communicating portions disposed at an angle to each other, one of said channel portions forming an inward continuation of said extension, the other of said channel portions opening at the inner face of said top, a normally closed spring controlled shiftable valve mechanism arranged in that channel portion forming a continuation of said extension, and a normally closed spring controlled vertically shiftable fluid pressure relief element slidably suspended from the top adjacent said enlargement and bodily movable relative to the top by and on the building up of fluid pressure supplied to the tank.

11. In a combined closure cap and fluid pressure supplying attachment for fuel tanks of automotive vehicles, a cap member for closing the filling neck of the tank and including a depending rim and a top of disk-like form integral with the upper end of the rim, a radially disposed tubular extension integral with the outer edge of the top and forming a pressure intake, said top being formed with a radially disposed fluid pressure conducting channel opening at one end at the inner face of the top and at its other end opening into said extension, a radially disposed normally closed spring controlled shiftable valve mechanism arranged in said channel, a normally open upwardly shiftable gravity lowering atmospheric air intake element slidably suspended from said top and bodily movable upwardly through the latter by and on the application of fluid pressure to the tank, and a normally closed spring controlled vertically shiftable fluid pressure relief element slidably suspended from said top and bodily movable upwardly through to said top by and on the building up of fluid pressure within the tank.

12. In a combined closure cap and fluid pressure supplying attachment for fuel tanks of automotive vehicles, a cap member for closing the filling neck of the tank and including a depending rim and a top of disc-like form integral with the upper end of the rim, a radially disposed tubular extension integral with the outer edge of the top and forming a pressure intake, said top being formed with a radially disposed fluid pressure conducting channel opening at one end at the inner face of the top and at its other end opening into said extension, a radially disposed normally closed spring controlled shiftable valve mechanism arranged in said channel, a normally open atmospheric air intake element suspended from the top and bodily movable to closed position on the application of fluid pressure to the tank, and a normally closed fluid pressure relief element bodily movable to open position by and on the building up of fluid pressure within the tank.

ANTHONY A. VARESE.